(12) United States Patent
Szczepanski et al.

(10) Patent No.: US 10,690,036 B1
(45) Date of Patent: Jun. 23, 2020

(54) DIAGNOSTIC TEST FOR ENGINE EXHAUST SYSTEM

(71) Applicant: DENSO International America, Inc., Southfield, MI (US)

(72) Inventors: Edward Szczepanski, Grosse Pointe Woods, MI (US); Michael Lewis, Dearborn, MI (US)

(73) Assignee: DENSO International America, Inc., Southfield, MI (US)

( * ) Notice: Subject to any disclaimer, the term of this patent is extended or adjusted under 35 U.S.C. 154(b) by 30 days.

(21) Appl. No.: 16/227,920

(22) Filed: Dec. 20, 2018

(51) Int. Cl.
  *F01N 11/00*  (2006.01)
  *F02D 41/02*  (2006.01)

(52) U.S. Cl.
  CPC ........ *F01N 11/007* (2013.01); *F02D 41/0235* (2013.01); *F01N 2550/02* (2013.01)

(58) Field of Classification Search
  CPC combination set(s) only.
  See application file for complete search history.

(56) References Cited

U.S. PATENT DOCUMENTS

| | | | |
|---|---|---|---|
| 5,526,793 A | 6/1996 | Johansson | |
| 5,721,375 A | 2/1998 | Bidner | |
| 5,930,992 A | 8/1999 | Esch et al. | |
| 7,007,457 B2 * | 3/2006 | Ellmer | F01N 3/2006 60/274 |
| 7,677,027 B2 * | 3/2010 | Iida | F01N 3/101 60/274 |
| 7,918,085 B2 * | 4/2011 | Yoshioka | F01N 3/206 60/274 |
| 8,555,614 B2 | 10/2013 | Sato | |
| 9,200,587 B2 | 12/2015 | Serrano | |
| 9,239,037 B2 | 1/2016 | Carlson et al. | |
| 9,670,819 B2 * | 6/2017 | Aoki | F02D 41/0235 |
| 9,778,160 B2 | 10/2017 | Zhang | |
| 9,790,867 B2 | 10/2017 | Carlson et al. | |
| 9,891,137 B2 | 2/2018 | Chen et al. | |
| 9,896,988 B2 * | 2/2018 | Lee | F01N 3/0885 |
| 9,982,611 B2 | 5/2018 | Tripathi et al. | |
| 10,215,115 B1 | 2/2019 | Ranga et al. | |
| 10,323,562 B2 | 6/2019 | Van Nieuwstadt et al. | |
| 2002/0069638 A1 | 6/2002 | Glugla et al. | |
| 2002/0129597 A1 | 9/2002 | Glugla et al. | |
| 2004/0098970 A1 | 5/2004 | Foster | |
| 2004/0221832 A1 | 11/2004 | Takahashi et al. | |
| 2004/0255905 A1 | 12/2004 | Bauerle et al. | |
| 2006/0053772 A1 * | 3/2006 | Dou | F01N 3/0814 60/285 |
| 2006/0243040 A1 | 11/2006 | Reed et al. | |
| 2007/0051092 A1 | 3/2007 | Pallett et al. | |

(Continued)

FOREIGN PATENT DOCUMENTS

| | | |
|---|---|---|
| DE | 102005049069 A1 | 4/2007 |
| DE | 102011088843 A1 | 6/2013 |
| WO | 2019238246 A1 | 12/2019 |

*Primary Examiner* — Binh Q Tran
(74) *Attorney, Agent, or Firm* — Brooks Kushman P.C.

(57) ABSTRACT

A vehicle controller is programmed to, in response to a command to perform a diagnostic test, operate an engine under one or more lean conditions and/or operate the engine under one or more rich conditions to determine if a catalytic converter, a pre-catalyst oxygen sensor, and a post-catalyst oxygen sensor within the exhaust system of the engine are functioning properly.

20 Claims, 7 Drawing Sheets

(56) References Cited

U.S. PATENT DOCUMENTS

| | | |
|---|---|---|
| 2007/0051351 A1 | 3/2007 | Pallett et al. |
| 2007/0240695 A1 | 10/2007 | Mitsuda et al. |
| 2008/0243362 A1 | 10/2008 | Mitsuda et al. |
| 2009/0094963 A1 | 4/2009 | Mizoguchi et al. |
| 2009/0118985 A1 | 5/2009 | Whitney et al. |
| 2009/0306846 A1 | 12/2009 | Jeong |
| 2010/0031738 A1 | 2/2010 | Feldkamp et al. |
| 2010/0154738 A1 | 6/2010 | Tsukamoto et al. |
| 2010/0175462 A1 | 7/2010 | Doering et al. |
| 2010/0175463 A1 | 7/2010 | Doering et al. |
| 2010/0288037 A1 | 11/2010 | Gibson et al. |
| 2012/0173122 A1 | 7/2012 | Nishikiori et al. |
| 2014/0041630 A1 | 2/2014 | Carlson et al. |
| 2014/0163841 A1 | 6/2014 | Sane |
| 2014/0261309 A1 | 9/2014 | Chen et al. |
| 2014/0360477 A1 | 12/2014 | Doering et al. |
| 2014/0366835 A1 | 12/2014 | Walter |
| 2015/0051816 A1 | 2/2015 | Glugla et al. |
| 2015/0369155 A1 * | 12/2015 | Ueda ............... F02D 41/1454 60/286 |
| 2016/0061127 A1 | 3/2016 | Chen et al. |
| 2016/0115884 A1 | 4/2016 | Vanderwege et al. |
| 2016/0195031 A1 | 7/2016 | Willems et al. |
| 2016/0222899 A1 | 8/2016 | Glugla |
| 2016/0245723 A1 | 8/2016 | Miyamoto et al. |
| 2016/0258375 A1 | 9/2016 | Jammoussi et al. |
| 2016/0258376 A1 | 9/2016 | Jammoussi et al. |
| 2016/0281622 A1 | 9/2016 | Miyamoto et al. |
| 2016/0333809 A1 | 11/2016 | Jammoussi et al. |
| 2017/0321587 A1 | 11/2017 | Marlett et al. |
| 2017/0350332 A1 | 12/2017 | Martin et al. |
| 2017/0356353 A1 | 12/2017 | Rollinger et al. |
| 2017/0356363 A1 | 12/2017 | Jammoussi et al. |
| 2017/0356368 A1 | 12/2017 | Richards et al. |
| 2017/0356370 A1 | 12/2017 | Doering et al. |
| 2017/0356374 A1 | 12/2017 | Rollinger et al. |
| 2017/0356380 A1 | 12/2017 | Surnilla et al. |
| 2018/0080398 A1 | 3/2018 | Leone |
| 2018/0216562 A1 | 8/2018 | Dudar |
| 2018/0230914 A1 | 8/2018 | McCarthy, Jr. et al. |
| 2018/0274471 A1 | 9/2018 | Dudar |
| 2019/0033170 A1 | 1/2019 | Dudar |
| 2019/0186401 A1 | 6/2019 | Dudar |
| 2019/0218989 A1 | 7/2019 | Dudar |
| 2019/0264628 A1 | 8/2019 | Dudar |
| 2019/0271265 A1 | 9/2019 | Iannone et al. |
| 2019/0339164 A1 | 11/2019 | Kupiec et al. |
| 2019/0390610 A1 | 12/2019 | Ulstad et al. |

* cited by examiner

DIAGNOSTIC TEST FOR ENGINE EXHAUST SYSTEM

TECHNICAL FIELD

The present disclosure relates to diagnostic testing for an engine exhaust system.

BACKGROUND

Exhaust systems of internal combustion engines may include a catalytic converter that reduces the amount of emissions within the exhaust gas produced by the engine. The exhaust systems of internal combustion engines may also include one or more oxygen sensors that measure the amount of oxygen that is present within the exhaust gas.

SUMMARY

A vehicle controller is programmed to, in response to a command to perform a diagnostic test: operate an engine under a first lean condition at a commanded air-fuel ratio to decrease an oxygen storage capacity of a catalytic converter from a set value to an adjusted value; determine an actual air-fuel ratio based on measuring an oxygen content within exhaust gas entering the catalytic converter via a first sensor, while the engine is operating under the first lean condition; and in response to a difference between the actual air-fuel ratio and the commanded air-fuel ratio being less a first tolerance from zero and a change in the oxygen content within the exhaust gas exiting the catalytic converter, that is measured via a second sensor, being less than a second tolerance from zero, while the engine is operating under the first lean condition, register that the first sensor and the catalytic converter are functioning properly.

A vehicle controller is programmed to, in response to a command to perform a diagnostic test: operate an engine under a first rich condition at a commanded air-fuel ratio to increase an oxygen storage capacity of a catalytic converter from a set value to an adjusted value; determine an actual air-fuel ratio based on measuring an oxygen content within exhaust gas entering the catalytic converter via a first sensor, while the engine is operating under the first rich condition; and in response to a difference between the actual air-fuel ratio and the commanded air-fuel ratio being less a first tolerance from zero and a change in the oxygen content within the exhaust gas exiting the catalytic converter, that is measured via a second sensor, being less than a second tolerance from zero, while the engine is operating under the first rich condition, register that the first sensor and the catalytic converter are functioning properly.

A vehicle controller is programmed to, in response to a command to perform a diagnostic test: operate an engine under a first lean condition at a first commanded air-fuel ratio to decrease an oxygen storage capacity of a catalytic converter from a set value to an adjusted value; determine an actual air-fuel ratio based on measuring an oxygen content within exhaust gas entering the catalytic converter via a first sensor, while the engine is operating under the first lean condition; operate the engine under a first rich condition at a second commanded air-fuel ratio to increase the oxygen storage capacity of the catalytic converter from the set value to a second adjusted value; determine the actual air-fuel ratio based on measuring the oxygen content within exhaust gas entering the catalytic converter via the first sensor, while the engine is operating under the first rich condition; and in response to a difference between the actual air-fuel ratio and the first commanded air-fuel ratio being less a first tolerance from zero, while the engine is operating under the first lean condition, a difference between the actual air-fuel ratio and the second commanded air-fuel ratio being less the first tolerance from zero, while the engine is operating under the first rich condition, and a change in the oxygen content within the exhaust gas exiting the catalytic converter, that is measured via a second sensor, being less than a second tolerance from zero, while the engine is operating under the first lean condition and the first rich condition, register that the first sensor and the catalytic converter are functioning properly.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
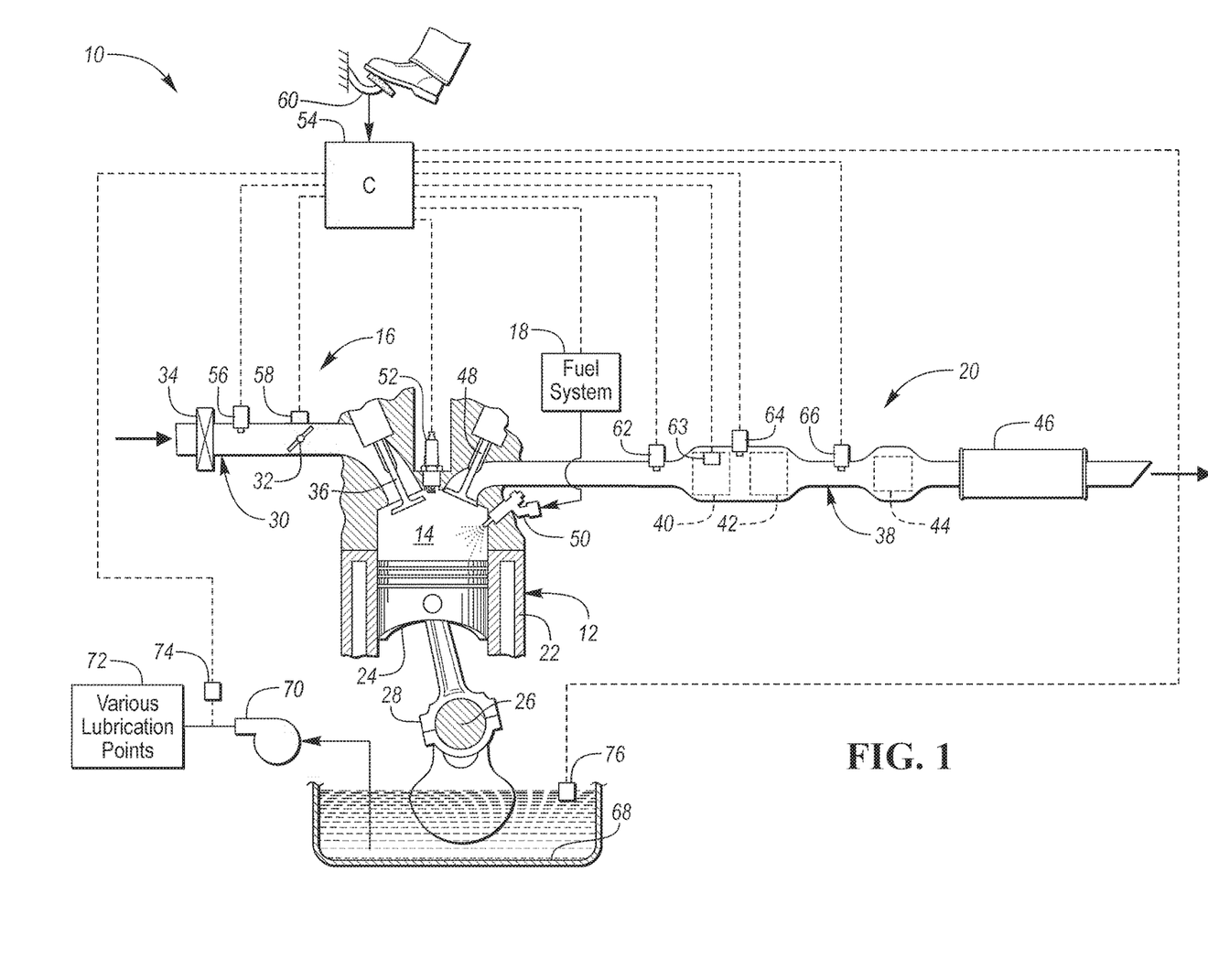
FIG. 1 is a schematic illustration of a vehicle including a single cylinder of an internal combustion engine that has multiple cylinders, an air intake system, a fuel delivery system, and an exhaust system.
Figure 2:
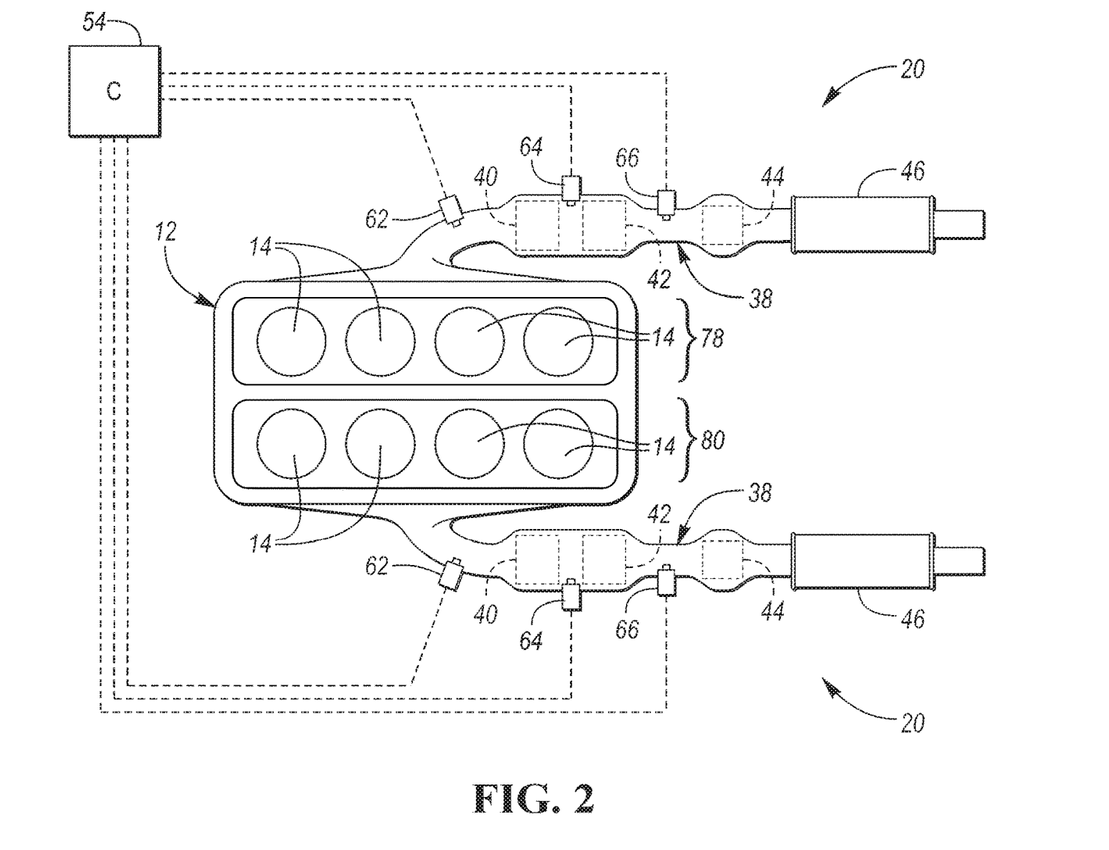
FIG. 2 is a schematic illustration of the multiple cylinders of the internal combustion engine and the exhaust system.

Referring to FIGS. 1 and 2, a vehicle 10 and an internal combustion engine 12 that includes multiple cylinders are illustrated. The schematic of FIG. 1 illustrates a single cylinder 14 of the internal combustion engine 12, an air intake system 16, a fuel delivery system 18, and an exhaust system 20. The schematic of FIG. 2 illustrates the multiple cylinders 14 of the engine 12 and the exhaust system of the engine 12. It should be understood that the single cylinder 14 illustrated in FIG. 1 may be representative of one or all of the cylinders 14 of the engine 12. It should further be understood, that the air intake system 16 and fuel delivery system 18 illustrated in FIG. 1 are representative of the systems that deliver air and fuel, respectively, to all of the cylinders 14 of the engine 12, while the exhaust system 20 illustrated in FIG. 1 is representative of the system that channels exhaust gas away from all of the cylinders 14 of the engine 12.

The engine 12 includes an engine block 22 that defines each of the cylinders 14. A piston 24 is disposed within each of the cylinders 14. The pistons 24 are configured to transfer the energy that results from combusting fuel within each cylinder 14 into kinetic energy, which is utilized to rotate a crankshaft 26. Each piston 24 is connected to the crankshaft 26 via a connecting rod 28. The crankshaft 26 then transfers the rotational energy to one or more drive wheels (not shown) of the vehicle 10 in order to propel the vehicle 10. Intermediate components, such as driveshafts, a torque converter, a transmission gearbox, universal joints, differentials, etc. may be disposed between the crankshaft 26 and the drive wheels. The intermediate components are configured to transfer the rotational power of the crankshaft 26 to the drive wheels.

The air intake system 16 includes one or more manifolds, pipes, ducts, or conduits 30 that are configured to channel air from the ambient surroundings and into the cylinders 14. The amount of air that is being channeled into the cylinders 14 may be controlled by the throttle valve 32. An air filter 34 may be disposed proximate to the intake of the air intake system 16. Each of the cylinders 14 includes an air intake valve 36 is that is configured to establish fluid communication between the cylinder 14 and the air intake system 16 when in an opened position and isolate the cylinder 14 from the air intake system 16 when in a closed position. The air intake valve 36 of each cylinder 14 will be in an opened position during the intake stroke of the respective piston 24 and closed during the compression, combustion, and exhaust strokes of the respective piston 24.

The exhaust system 20 includes one or more manifolds, pipes, ducts, or conduits 38 there configured to channel exhaust gas away from the cylinders 14 and to the ambient surroundings. The exhaust system 20 includes a first catalyst 40 (or first catalytic converter) that is configured to reduce the amount of emissions (e.g., $NO_x$ gases or unspent hydrocarbons) in the exhaust gas that is channeled to the ambient air or surroundings. The exhaust system 20 may include a second catalyst 42 (or second catalytic converter) that is configured to further reduce the amount of emissions in the exhaust gas that are channeled to the ambient air or surroundings. The second catalyst 42 may be a redundant catalyst that only further reduces the emissions in the exhaust when the first catalyst 40 is not operating at full capacity or has some malfunction. The exhaust system 20 may further include a particulate filter 44 that is configured to reduce particulate matter in the exhaust and a muffler 46 that is configured to reduce noise. The particulate filter 44 and the muffler 46 may each be downstream of the first catalyst 40 and the second catalyst 42. Each of the cylinders 14 includes an exhaust valve 48 is that is configured to establish fluid communication between the cylinder 14 and the exhaust system 20 when in an opened position and isolate the cylinder 14 from the exhaust system 20 when in a closed position. The exhaust valve 48 of each cylinder 14 will be in an opened position during the exhaust stroke of the respective piston 24 and closed during the intake, compression, and combustion strokes of the respective piston 24.

One or more camshafts (not shown) may be configured to open and close the air intake valve 36 and exhaust valve 48 of each cylinder 14. The camshafts may be connected to the crankshaft 26 by a gearing arrangement, belted arrangement, or some other arrangement to ensure that the air intake valves 36 and exhaust valves 48 are opening and closing when necessary. More specifically, the connection between the crankshaft 26 and the one or more camshafts will ensure that the air intake valve 36 of each cylinder 14 is in the opened position during the intake stroke of the respective piston 24 and closed during the compression, combustion, and exhaust strokes of the respective piston 24. The connection between the crankshaft 26 and the one or more camshafts will also ensure that the exhaust valve 48 of each cylinder 14 is in the opened position during the exhaust stroke of the respective piston 24 and closed during the intake, compression, and combustion strokes of the respective piston 24.

The first catalyst 40 and second catalyst 42 each may consist of a brick that is coated in alumina. The alumina in turn is coated with rhodium, cerium, and platinum or palladium. The rhodium is configured to reduce the amount NOx gases (combinations of nitrogen and oxygen such NO, NO2, etc.) that are present within the exhaust. More specifically, the rhodium is configured to convert the NOx gases into nitrogen (N2) and oxygen (O2) by reacting the NOx gases with oxygen. The platinum or palladium is configured to reduce the amount of unspent hydrocarbons (e.g., C8H18 or C1H4) that are present within the exhaust. More specifically, the platinum or palladium is configured to convert the hydrocarbons into carbon dioxide (CO2) and water (H2O) by reacting the hydrocarbons with oxygen. The rhodium may also reduce the amount of unspent hydrocarbons within the exhaust, however, the rhodium is primarily utilized to reduce the amount of amount NOx gases that are present within the exhaust. The platinum or palladium may also reduce the amount of amount NOx gases that are present within the exhaust, however, the platinum or palladium is primarily utilized to reduce the amount of unspent hydrocarbons that are present within the exhaust. The cerium acts to store oxygen, which is then supplied to the rhodium and the platinum or palladium to effect the reactions described above to convert NOx gases into nitrogen (N2) and oxygen (O2) and to convert the unspent hydrocarbons into carbon dioxide (CO2) and water (H2O).

The particulate filter 44 is configured to filter any particulate matter out of the exhaust gas in order to prevent the particulate matter from being channeled to the ambient air or surroundings. Particulate matter may refer to any particle within the exhaust guest including rust, oil mixed with any solid material (e.g., metal shavings), simply oil by itself, carbon particles, suspended particulate matter (SPM), thoracic and respirable particles, inhalable coarse particles, which are coarse particles with a diameter between 2.5 and 10 micrometers (μm), fine particles with a diameter of 2.5 μm or less, ultrafine particles, soot (i.e., a mass of impure carbon particles resulting from the incomplete combustion of hydrocarbons), etc.

The fuel delivery system 18 is configured to deliver fuel to each of the cylinders 14. More specifically, the fuel delivery system may include a fuel tank for storing fuel, conduits that establish fluid communication between the fuel tank and fuel injectors 50, and a fuel pump that is configured to direct the fuel from the fuel tank, through the conduits, and to each of the fuel injectors 50. Each cylinder 14 also includes a spark plug 52 that is configured to ignite the air and fuel mixture that is within the cylinder 14 and push down on the respective piston 24 during the power stroke of the cylinder 14.

The vehicle 10 includes a controller 54, which may be a powertrain control unit (PCU). While illustrated as one controller, the controller 54 may be part of a larger control system and may be controlled by various other controllers throughout the vehicle 10, such as a vehicle system controller (VSC). It should therefore be understood that the controller 54 and one or more other controllers can collectively be referred to as a "controller" that controls various components of the vehicle 10 in response to signals from various sensors to control functions such as, shutting down one or more of the cylinders 14 of the engine 12 during a skip-fire mode, selecting or scheduling shifts of a vehicle transmission, adjusting the air-fuel mixture being delivered to the engine 12, etc.

The controller 54 may include a microprocessor or central processing unit (CPU) that is in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 54 in controlling the engine 12 or subcomponents of the vehicle 10.

The controller 54 may be configured to increase or decrease the power output of the engine 12. More specifically, the controller 54 may be configured to increase or decrease the power output of the engine 12 by increasing or decreasing the airflow and fuel flow into each cylinder 14. The airflow may be increased by adjusting the throttle valve 32 towards a fully open position or decreased by adjusting the throttle valve towards a fully closed position. The fuel flow may be increased by opening the fuel injectors 50 for longer periods of time during each injection of fuel into the cylinder 14 or decreased by opening the fuel injectors 50 for shorter periods of time during each injection of fuel into the cylinder 14. The controller 54 may also increase or decrease the power output of the engine 12 by either retarding or advancing the spark timing of the spark plugs 52.

A mass airflow sensor 56 may be configured to measure the amount of air flowing into the air intake system 16, which is eventually delivered to the cylinders 14, and communicate the amount of air flowing into the air intake system 16 to the controller 54. A throttle position sensor 58 may be configured to communicate the position of the throttle valve 32 to the controller 54. The controller 54 may also be in communication with each of the spark plugs 52, the fuel system 18, and each of the fuel injectors 50. Based on a power demand that is delivered to the controller 54, the controller may adjust the throttle valve 32 position to increase or decrease airflow into the cylinders 14, adjust the timing of the spark plugs 52, and/or adjust the amount of fuel being delivered into the cylinders 14 to either increase or decrease the power output of the engine 12 to meet the power demand. The power demand may be input into the controller 54 by an operator of the vehicle 10 when the operator engages an accelerator pedal 60. Under certain circumstances the power demand may be based on a presetting that is stored as control logic within the controller 54. For example, if the vehicle operator is not depressing the accelerator pedal 60 and the engine 12 is on, the amount of power the engine 12 is producing may be adjusted to a preset idle value.

Also, depending on power demand or for emission control purposes, the engine 12 may be configured to operate at a stoichiometric air-fuel mass ratio, a lean air-fuel mass ratio, or a rich air-fuel mass ratio. The air-fuel mass ratio may simply be referred to as the air-fuel ratio. Stoichiometric air-fuel mass ratio has a value of 14.7 to 1. A rich air-fuel mass ratio will be less than 14.7 to 1 and a lean air-fuel mass ration will be greater than 14.7 to 1. An air-fuel equivalence ratio ($\lambda$) has an air-fuel mass ratio that is stoichiometric when $\lambda$ is equal to 1, an air-fuel mass ratio that is rich when $\lambda$ is less than 1, and an air-fuel mass ratio that is lean when $\lambda$ is greater than 1. The air-fuel mass ratio may be controlled, via the controller 54, by adjusting the amount of air and fuel flowing into the cylinders 14.

A first lambda or oxygen sensor 62 may be disposed within the conduits 38 of the exhaust system 20 between the cylinders 14 and the first catalyst 40. The first oxygen sensor 62 may be a universal heated exhaust gas oxygen sensor. The first oxygen sensor 62 is configured to measure the amount of oxygen ($O_2$) that is within the exhaust gas exiting the cylinder 14. Based on the measured amount oxygen in the exhaust gas, the first oxygen sensor 62 generates a signal (e.g., a voltage or current) that correlates with the current air-fuel equivalence ratio ($\lambda$) that the engine 12 is operating at. The signal generated by the first oxygen sensor 62 may indicative of a lean, stoichiometric, or rich current air-fuel equivalence ratio ($\lambda$). The first oxygen sensor 62 communicates the air-fuel ratio or air-fuel equivalence ratio ($\lambda$) measurement to the controller 54, which provides a feedback control to the controller 54. The feedback control may include adjusting the air and/or fuel flowing (i.e., flow rates) into the cylinders 14 via the controller 54 if the air-fuel equivalence ratio ($\lambda$) measured by the first oxygen sensor 62 is different than the air-fuel equivalence ratio ($\lambda$) that is being commanded to the engine 12. More specifically, the feedback control may include adjusting the air and/or fuel flowing into the cylinders 14 to drive the air-fuel equivalence ratio ($\lambda$) that is being measured by the first oxygen sensor 62 toward the air-fuel equivalence ratio ($\lambda$) that is being commanded to the engine 12.

A second lambda or oxygen sensor 64, which has the same functionality as the first oxygen sensor 62, may be disposed within the conduits 38 of the exhaust system 20 between the first catalyst 40 and the second catalyst 42. The second oxygen sensor 64 is utilized to determine the efficiency at which the first catalyst 40 reduces the amount of emissions within the exhaust gas. The second oxygen sensor 64 is configured to communicate a signal that correlates with the measured air-fuel equivalence ratio ($\lambda$) of the exhaust gas back to the controller 54, after the exhaust gas has passed through the first catalyst 40. A particulate sensor 66 may be disposed within the conduits 38 of the exhaust system 20 between the second catalyst 42 and the particulate filter 44. The particulate sensor 66 is configured to measure the amount of particulate matter within the exhaust gas and communicate the measurement to the controller 54 in the form of a signal (e.g., a voltage or current).

One or more temperature sensors 63 may configured to measure the temperature of the first catalyst 40 and/or the second catalyst 42. The temperature sensors 63 are configured to communicate a signal (e.g., a voltage or current) that correlates with a measured temperature of the first catalyst 40 and/or the second catalyst 42 back to the controller 54.

The engine 12 also includes an oil pan or sump 68. An oil pump 70 is configured to direct oil out of the sump 68 and towards various lubrication points 72, such as any of the bearings, journals, valve stems, or any of the other moving parts within the engine 12. A pressure sensor 74 may be configured to measure the pressure of the oil that is being output from the oil pump 70. The pressure sensor 74 may then communicate the oil pressure to the controller 54. An oil level sensor 76 may be configured to measure the level of the oil within the pan or sump 68. The oil level sensor 76 may then communicate the level of the oil to the controller 54.

Referring to FIG. 2, the engine 12 is illustrated as an eight-cylinder engine that includes a first bank 78 of four cylinders 14 and a second bank 80 of four cylinders 14. The first bank 78 of cylinders includes an exhaust system 20 that is configured to channel the exhaust gas away from the first bank 78 of cylinders only. The second bank 80 of cylinders includes an exhaust system 20 that is configured to channel the exhaust gas away from the second bank 80 of cylinders only. Although FIG. 2 illustrates an eight-cylinder engine that includes two banks of cylinders where each bank has its own exhaust system 20, it should be understood that the engine 12 may include two or more cylinders that comprise of one or more banks of cylinders where each bank of cylinders may include a separate exhaust system.

The engine 12 may be a variable displacement engine or a skip-fire engine that may be controlled to shut down or deactivate one or more cylinders 14 while the engine 12 is operating, resulting in the engine 12 being powered by less than all the cylinders 14. Shutting down or deactivating a specific cylinder 14 a during skip-fire mode requires shutting down or deactivating the air intake valve 36, exhaust valve 48, spark plug 52, and the fuel injector 50. The engine 12 may be referred to as operating in a skip-fire mode when being powered by less than all of the cylinders 14. The cylinders 14 may be shut down or deactivated in any known pattern to increase the fuel efficiency when conditions are such that the engine 12 may effectively operate in the skip-fire mode to increase fuel efficiency without disturbing the driving requirements of the vehicle operator (e.g., when the number of cylinders can be reduced without reducing the speed of the vehicle). However, it may be desirable to shut down or deactivate the cylinders 14 based on the position of the cylinders 14 in order to directionally equalize the forces that are being transferred to the crankshaft 26 from the pistons 24. Furthermore, which of the cylinders 14 are shut down or deactivated and which of the cylinders 14 are operating may always be changing or rotating when in the skip-fire mode, which may also help to directionally equalize the forces that are being transferred to the crankshaft 26 from the pistons 24.

Figure 3A:
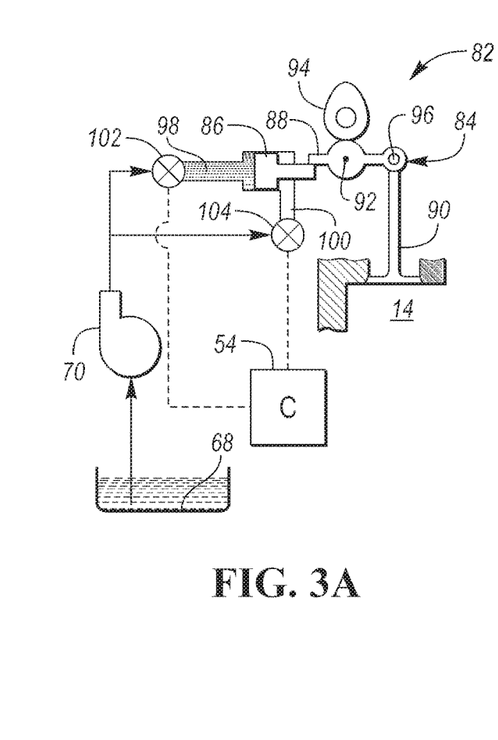
FIGS. 3A-3C illustrate a mechanism that is configured to disable the valves in a variable displacement engine.
Figure 3B:
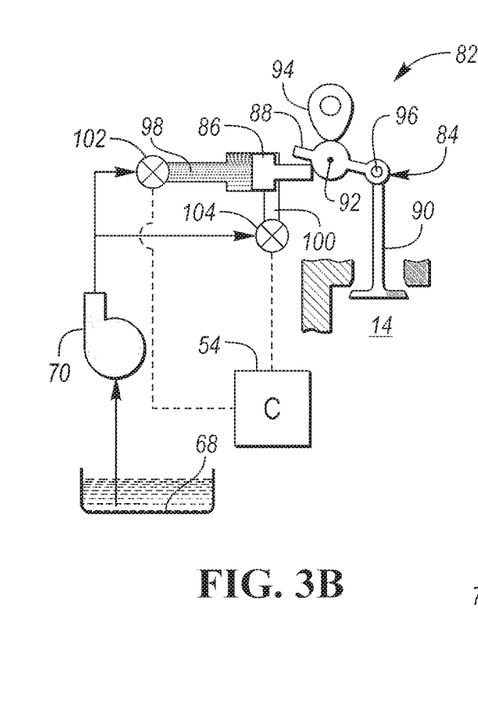
Figure 3C:
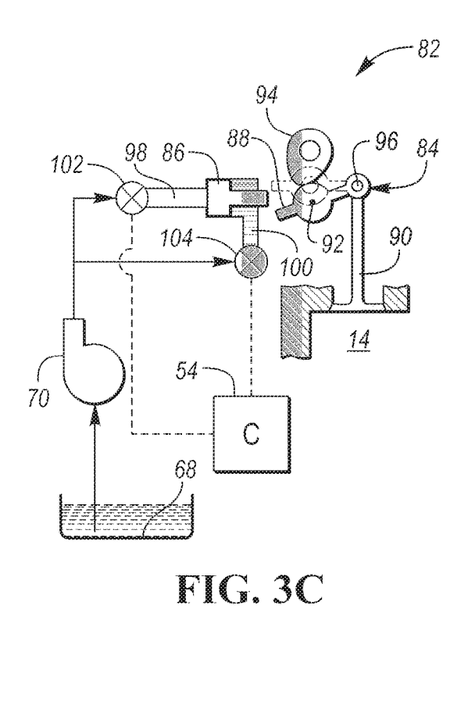

Referring to FIGS. 3A-3C a mechanism 82 that is configured to deactivate the air intake valves 36 and exhaust valves 48 in the variable displacement/skip-fire engine 12 is illustrated. During a skip-fire mode, if a particular cylinder 14 is shut down or deactivated, both the air intake valve 36 and the exhaust valve 48 of that particular cylinder 14 will also be deactivated (i.e., the air intake valve 36 and exhaust valve 48 will be in closed positions and disabled from transitioning to opened positions). The mechanism 82 includes a deactivation arm 84 and a locking pin 86. The locking pin 86 is configured to advance and engage a protrusion 88 that extends outward from the deactivation arm 84. The locking pin 86 is also configured to retract and disengage from the protrusion 88 that extends outward from the deactivation arm 84. A stem valve 90 is secured to an opposing side of the deactivation arm 84 relative to the protrusion 88. The stem valve 90 may be representative of both the air intake valves 36 and the exhaust valves 48.

The deactivation arm 84 will rotate about a first pivot 92 when engaged by a camshaft 94 while the locking pin 86 is engaging the protrusion 88. Rotation of the deactivation arm 84 about the first pivot 92 allows the stem valve 90 to transition between a closed position (see FIG. 3A) and an opened position (see FIG. 3B). The stem valve 90 as depicted in FIGS. 3A and 3B has not been deactivated (i.e., the stem valve 90 will transition between the opened and closed positions in response to rotation of the camshaft 94). The deactivation arm 84 will rotate about a second pivot 96, which rotatably secures the deactivation arm 84 to the stem valve 90, when engaged by the camshaft 94 while the locking pin 86 is disengaged from the protrusion 88. Rotation of the deactivation arm 84 about the second pivot 96 results in the stem valve 90 remaining in the closed position regardless of the position of the camshaft 94 and the position of the deactivation arm 84 (see FIG. 3C). The stem valve 90 as depicted in FIG. 3C has been deactivated (i.e., the stem valve 90 will remain in the closed position and will not transition between the opened and closed positions in response to engagement between the deactivation arm and the camshaft 94).

The locking pin 86 may be advanced and retracted by a pressurized fluid. The oil pump 70 may be configured to deliver pressurized oil to a first chamber 98 that is located on a first side of the locking pin 86 in order to advance the locking pin 86 such that the locking pin 86 engages the protrusion 88. The oil pump 70 may also be configured to deliver pressurized oil to a second chamber 100 that is located on a second side of the locking pin 86 in order to retract the locking pin 86 such that the locking pin 86 disengages from the protrusion 88. A first fluid valve 102 may be disposed within a conduit between the oil pump 70 and the first chamber 98. A second valve 104 may be disposed within a conduit between the oil pump in the second chamber 100. The pressurized fluid is delivered to the first chamber 98 when the first valve 102 is open and the second valve 104 is closed. The pressurized fluid is delivered to the second chamber 100 and when the first valve 102 is closed and the second valve 104 is open. When the first valve 102 is opened and the second valve 104 is closed, the locking pin 86 is advanced (see FIGS. 3A and 3B) and the stem valve 90 may transition between the opened and closed positions (i.e., the stem valve 90 has not been deactivated). When the first valve 102 is closed and the second valve 104 is opened, the locking pin 86 is retracted (see FIG. 3C), the stem valve 90 remains in the closed position, and the stem valve 90 cannot transition to the opened position (i.e., the stem valve 90 has been deactivated).

The controller 54 may be configured to open and close the first valve 102 and the second valve 104 to either advance or retract the locking to pin 86 to respectively activate or deactivate the stem valve 90. More specifically, the controller 54 may be configured to activate or deactivate the air intake valve 36 and the exhaust valve 48 of a particular cylinder 14 by utilizing the mechanism 82 depicted in FIGS. 3A-3C, depending on whether the engine 12 is operating in a mode where the particular cylinder 14 is activated or operating in a skip-fire mode that requires the particular cylinder 14 to be shut down or deactivated. When the air intake valve 36 and the exhaust valve 48 of a particular cylinder 14 are deactivated, the particular cylinder 14 is also deactivated. Each valve (air intake valve 36 and exhaust valve 48) for each cylinder 14 may include an associated mechanism 82 for disabling the particular valve. The mechanism 82 depicted in FIGS. 3A-3C is not intended to be limiting. The engine 12 may be a variable displacement/ skip-fire engine where the valves of a particular cylinder (and therefore the cylinder itself) may be deactivated by any method known in the art.

Figure 4A:
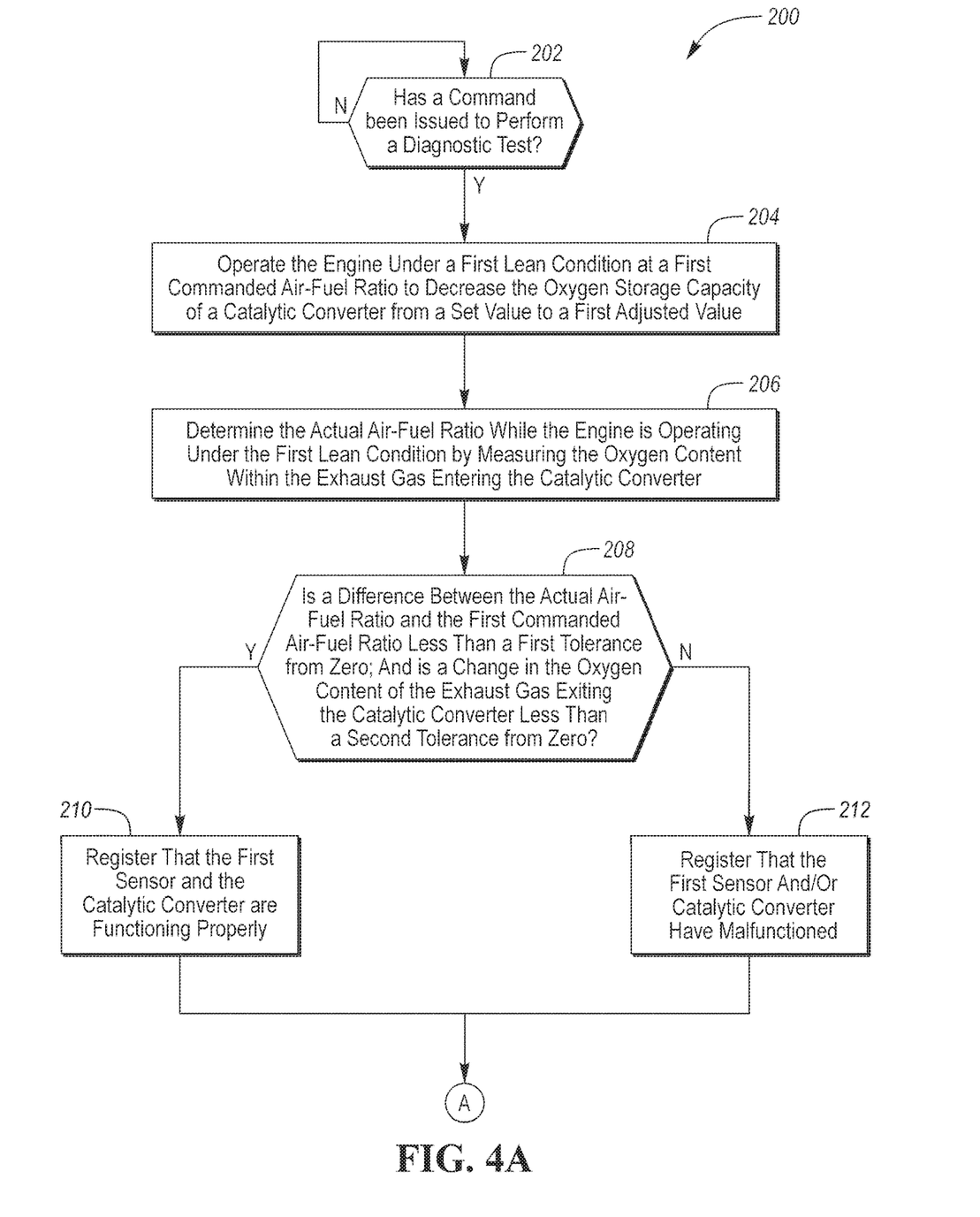
FIGS. 4A and 4B represent a flowchart of a method of conducting a first diagnostic test on the exhaust system of an engine.
Figure 4B:
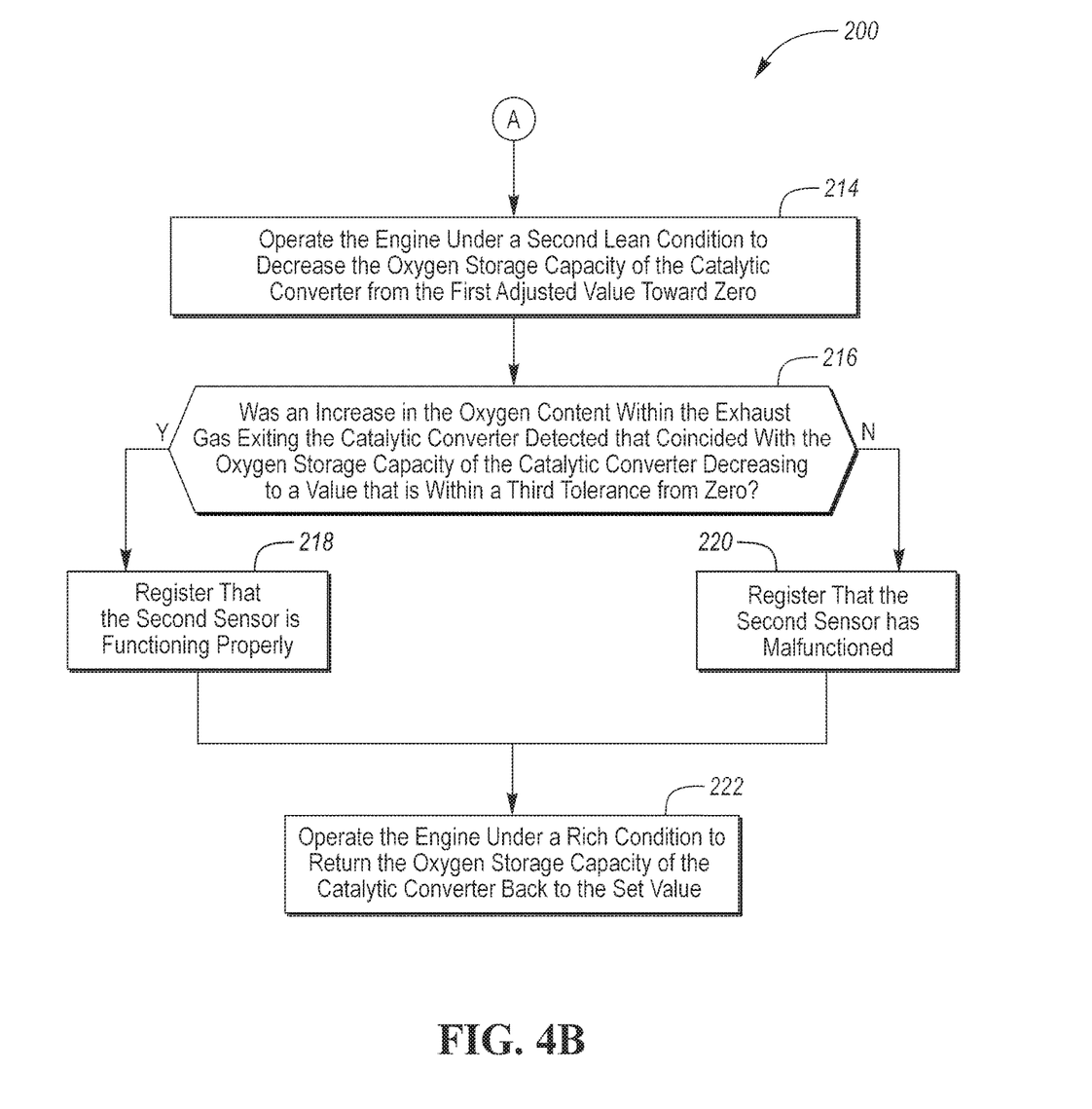

Referring to FIGS. 4A and 4B, a flowchart of a method 200 of conducting a first diagnostic test on the exhaust system 20 of the engine 12 is illustrated. The method 200 may be stored as control logic and/or an algorithm within the controller 54. The controller 54 may be programmed to implement the method 200 by controlling the various components of the vehicle 10. The method 200 begins at block 202 where it is determined if a command has been issued to perform the first diagnostic test. The diagnostic test may be referred to as an onboard diagnostic test that is configured to verify that the first catalytic converter (i.e., first catalyst 40), the first lambda or oxygen sensor 62, and the second lambda or oxygen sensor 64 of the exhaust system 20 are functioning properly. The purpose of the diagnostic test is to ensure that the specific components of the exhaust system 20 are properly reducing the emissions within the exhaust gas being produced by the engine 12 that is being introduced into the surrounding environment. The first diagnostic test should be performed once the first catalytic converter 40 has obtained the light-off temperature. The light-off temperature is the temperature at which a catalytic converter (or the catalyst) operates most efficiently (i.e., where the catalytic converter reduces the maximum amount of emissions within the exhaust gas of the engine 12). The first diagnostic test may be performed at least once during each cycle that the engine 12 is operated. The results of the first diagnostic test (i.e., whether the first catalyst 40, the first oxygen sensor 62, and the second oxygen sensor 64 are properly functioning) may be stored within the controller 54.

If it is determined that the command has not been issued to perform the first diagnostic test, the method 200 recycles back to the beginning of block 202. If it is determined that the command has been issued to perform the first diagnostic test, the method 200 moves on to block 204 where the engine 12 is operated under a first lean condition (i.e., a condition where the air-fuel ratio is lean and the air-fuel equivalence ratio, λ, is greater than 1) at a first commanded air-fuel ratio (i.e., a specified lean air-fuel ratio) to decrease the oxygen storage capacity (i.e., the amount of available space to store oxygen) of the first catalytic converter 40 from a set value to a first adjusted value. For example, the first catalyst 40 may have maximum oxygen storage capacity of 100 grams, the set value may be 50 grams, the adjusted value may be 20 grams, and the controller may be configured to decrease the oxygen storage capacity from 50 grams (i.e., the set value) to 20 grams (i.e., the adjusted value) at block 204. It should be under stood, however, that the oxygen storage capacity, the set value, and the adjusted value may be other values than listed in the example just above. The storage capacity of the first catalytic converter 40 is decreased when the engine 12 is operating under a lean condition because the excess oxygen in the exhaust gas produced by the engine 12 is captured in the first catalytic converter 40 and then be stored for future use. Based on measurements from the first oxygen sensor 62 and the second oxygen sensor 64, the amount of oxygen storage capacity within the first catalytic converter 40 may be estimated, adjusted, and stored within the controller 54 during all of the steps of the method 200 based on equations (1)-(3):

$$O_{in} = d\Phi \times Q \times 0.232 \times dt \qquad (1)$$

$$dO_{absorb} = K_{OX} \times dt \times (OSC_{max} - OSC_{pre}) \times d\Phi \qquad (2)$$

$$dO_{release} = K_{RE} \times dt \times OSC_{pre} \times d\Phi \qquad (3)$$

where $O_{in}$ represents the oxygen flowing into the first catalytic converter 40, $d\Phi$ represents the change in how rich or lean the exhaust gas flowing into the first catalytic converter 40 is over time, Q represents the energy or heat in the exhaust gas entering the first catalytic converter 40, 0.232 represents the percentage of oxygen in the atmosphere, dt represents the derivative of time, $dO_{absorb}$ represents the derivative or change in the oxygen absorption into the first catalyst 40, $K_{OX}$ represents the K factor or an amount or rate of oxidation taking place within the first catalytic converter 40, $OSC_{max}$ represents the maximum amount storage capacity within the first catalytic converter 40, $OSC_{pre}$ represents the amount oxygen storage capacity in a pre-condition of the first catalytic converter 40 (e.g., the set value referenced in block 204), $dO_{release}$ represents the derivative or change in oxygen reduction or oxygen released from the first catalytic converter 40, and $K_{RE}$ represents the K factor or an amount or rate of oxygen reduction taking place within the first catalytic converter 40. The values of $OSC_{max}$, $dO_{absorb}$, and $dO_{release}$, may be updated by dynamic or static learning over time as the first catalytic converter 40 degrades over time. The performance point (i.e., the point at which oxygen storage capacity the first catalytic converter 40 operates most efficiently) may be updated by balance point learning as the first catalytic converter 40 degrades over time.

Next, the method 200 moves on to block 206 where an actual or a measured air-fuel ratio that the engine 12 is operating at, while the engine 12 is operating under the first lean condition at block 204, is determined by measuring the oxygen content (or the by measuring the air-fuel equivalence ratio, λ) within the exhaust gas entering the first catalytic converter 40 via the first oxygen sensor 62. Once the actual or measured air-fuel ratio that the engine 12 is operating at is determined, the method 200 moves on to block 208 where it is determined if a difference between the actual or measured air-fuel ratio and the first commanded air-fuel ratio, while the engine 12 was operating under the first lean condition at block 204, is less than a first tolerance from zero, and if a change in the oxygen content of the exhaust gas exiting the catalytic converter 40 (which may be a change from a stoichiometric value where air-fuel equivalence ratio, λ, is equal to 1 to a lean value where the air-fuel equivalence ratio, λ, is greater than 1), while the engine 12 was operating under the first lean condition at block 204, is less than a second tolerance from zero. The oxygen content of the exhaust gas exiting the catalytic converter 40 is measured by the second oxygen sensor 64. If the second catalytic converter 40 is properly filtering out the emissions within the exhaust gas, the second oxygen sensor 64 should be detecting a stoichiometric air-fuel ratio (i.e., an air-fuel equivalence ratio, λ, of 1). Block 208 may more specifically determine if there is any change in the reading of the second oxygen sensor 64 from the stoichiometric air-fuel ratio that is less than the second tolerance from zero.

Ideally, the difference between the actual or measured air-fuel ratio and the first commanded air-fuel ratio and the change in the oxygen content of the exhaust gas exiting the catalytic converter 40 will be zero, while the engine 12 was operating under the first lean condition at block 204, if the first oxygen sensor 62 and the first catalytic converter 40 are operating properly and correctly. However, minor deviations from zero (i.e., the first tolerance and second tolerance) may be tolerated due to imperfections in the exhaust system 20 or minor calculation errors within the first oxygen sensor 62, second oxygen sensor 64, or the controller 54. For example, the first tolerance and second tolerance may correspond to a difference in air-fuel equivalence ratio, $\lambda$, from a desired or expected value that ranges between 0.00 and 0.01 toward either a leaner value or a richer value.

If is determined at block 208 that the difference between the actual or measured air-fuel ratio and the first commanded air-fuel ratio is less than the first tolerance from zero and the change in the oxygen content of the exhaust gas exiting the catalytic converter 40 is less than the second tolerance from zero, the method 200 moves on the block 210 where the controller 54 registers (e.g., stores within the memory of the controller 54) that the first oxygen sensor 62 and the first catalytic converter 40 are operating correctly and properly. Also, at block 210, the controller 54 may illuminate a warning light on a control panel within the vehicle 10 or activate some other notification system (e.g., a warning sound or haptic feedback) to alert the operator of the vehicle 10 that the first oxygen sensor 62 and/or the first catalytic converter 40 are operating correctly and properly.

If is determined at block 208 that the difference between the actual or measured air-fuel ratio and the first commanded air-fuel ratio is not less than the first tolerance from zero and/or the change in the oxygen content of the exhaust gas exiting the catalytic converter 40 is not less than the second tolerance from zero, method 200 moves on the block 212 where the controller 54 registers (e.g., stores within the memory of the controller 54) that the first oxygen sensor 62 and/or the first catalytic converter 40 are not operating correctly and have malfunctioned. Also, at block 212, the controller 54 may illuminate a warning light on a control panel within the vehicle 10 or activate some other notification system (e.g., a warning sound or haptic feedback) to alert the operator of the vehicle 10 that the first oxygen sensor 62 and/or the first catalytic converter 40 are not operating correctly and have malfunctioned. Alternatively, the warning may be a generic warning that simply illuminates a check engine light.

After block 210 or after block 212, method 200 moves on to block 214 where the engine 12 is operated under a second lean condition (i.e., a condition where the air-fuel ratio is lean and the air-fuel equivalence ratio, $\lambda$, is greater than 1) to decrease the oxygen storage capacity (i.e., the amount of available space to store oxygen) of the first catalytic converter 40 from the first adjusted value towards zero. In the example, where the first catalyst 40 has a maximum oxygen storage capacity of 100 grams, the set value is 50 grams, and the adjusted value is 20 grams, the controller 54 may be configured to decrease the oxygen storage capacity from 20 grams (i.e., the adjusted value) towards zero at block 214. Eventually, the oxygen storage capacity of the first catalytic converter 40 may be decreased to zero while the engine 12 is operating under the second lean condition at block 214. The engine 12 may be operated at a stoichiometric air-fuel ratio (i.e., and air-fuel equivalence ratio, $\lambda$, of 1) between being operated under the first lean condition and the second lean condition while the controller 54 is verifying whether or not the first oxygen sensor 62 and the first catalyst 40 are operating properly and correctly according to blocks 208, 210, and 212.

The oxygen storage capacity of the first catalytic converter 40 may be decreased from the first adjusted value towards zero (or eventually to zero) in incremental steps during the second lean condition at block 214. More specifically, the oxygen storage capacity of the first catalytic converter 40 may be decreased from the first adjusted value towards zero in incremental steps by operating the engine 12 under multiple lean conditions for short periods of time that are separated by periods of time where the engine 12 is operated under stoichiometric conditions. In the example, where the first catalyst 40 has a maximum oxygen storage capacity of 100 grams, the set value is 50 grams, and the adjusted value is 20 grams, the controller 54 may be configured to operate the engine 12 to decrease the oxygen storage capacity from 20 grams (i.e., the first adjusted value) by 1 gram during each short period that the engine 12 is operated under a lean condition at block 214. For example, the oxygen storage capacity may be decreased to 19 grams after a first short period of time, to 18 grams after a second short period time, to 17 grams after a third short period of time, etc. until the oxygen storage capacity of the first catalytic converter 40 is decreased to 0 grams.

Next, the method 200 moves on to block 216 where it is determined if an increase in the oxygen content within the exhaust gas exiting the first catalytic converter 40 was detected by the second oxygen sensor 64, while the engine 12 was operating under the second lean condition at block 214, that coincided with the oxygen storage capacity of the first catalytic converter 40 decreasing to a third tolerance from zero. An increase in the oxygen content detected at block 214 by the second oxygen sensor 64 may coincide with a change in the reading of the second oxygen sensor 64 from a stoichiometric value (i.e., where the air-fuel equivalence ratio, $\lambda$, is equal to 1) to a lean value (i.e., where the air-fuel equivalence ratio, $\lambda$, is greater than 1).

Ideally, an increase in the oxygen content within the exhaust gas exiting the first catalytic converter 40 should be detected by the second oxygen sensor 64 once the oxygen storage capacity reaches zero, while the engine 12 is operating under the second lean condition at block 214, if the second oxygen sensor 64 is operating properly and correctly. However, minor deviations from zero (i.e., the third tolerance) may be tolerated due to imperfections in the exhaust system 20 or minor calculation errors within the first oxygen sensor 62, second oxygen sensor 64, or the controller 54. For example, the third tolerance may correspond to a value that ranges between 0 grams and 1 gram from a zero value. Furthermore, if an increase in the oxygen content within the exhaust gas exiting the first catalytic converter 40 is detected within the third tolerance from zero, at a value other than zero, the controller 54 may be configured to update the known zero point of the oxygen storage capacity of the first catalytic converter 40 (i.e., the stored data point within the controller 54 that corresponds to the first catalytic converter 40 having zero oxygen storage capacity) such that a subsequent diagnostic test may be conducted more accurately.

If is determined at block 216 that an increase in the oxygen content within the exhaust gas exiting the first catalytic converter 40 was detected by the second oxygen sensor 64, while the engine 12 was operating under the second lean condition at block 214, that coincided with the oxygen storage capacity of the first catalytic converter 40 decreasing to a value that is within the third tolerance from zero, the method 200 moves on to block 218 where the controller 54 registers (e.g., stores within the memory of the controller 54) that the second oxygen sensor 64 is operating correctly and properly. Also, at block 218, the controller 54 may illuminate a warning light on a control panel within the vehicle 10 or activate some other notification system (e.g., a warning sound or haptic feedback) to alert the operator of the vehicle 10 that the second oxygen sensor 64 is operating correctly and properly.

Also at block 216, a determination that an increase in the oxygen content within the exhaust gas exiting the first catalytic converter 40 was detected by the second oxygen sensor 64, while the engine 12 was operating under the second lean condition at block 214, that coincided with the oxygen storage capacity of the first catalytic converter 40 decreasing to a value that is within the third tolerance from zero may verify that the first oxygen sensor 62 and the first catalytic converter 40 are operating correctly and properly (i.e., may verify block 210). Verification at block 218 may be required before, the controller 54 registers that the first oxygen sensor 62 and the first catalytic converter 40 are operating correctly and properly according to block 210.

If is determined at block 216 that an increase in the oxygen content within the exhaust gas exiting the first catalytic converter 40 was not detected by the second oxygen sensor 64, while the engine 12 was operating under the second lean condition at block 214, that coincided with the oxygen storage capacity of the first catalytic converter 40 decreasing to a value that is within the third tolerance from zero, the method 200 moves on to block 220 where the controller 54 registers (e.g., stores within the memory of the controller 54) that the second oxygen sensor 64 is not operating correctly and has malfunctioned. Also, at block 220, the controller 54 may illuminate a warning light on a control panel within the vehicle 10 or activate some other notification system (e.g., a warning sound or haptic feedback) to alert the operator of the vehicle 10 that the second oxygen sensor 64 is not operating correctly and has malfunctioned. Alternatively, the warning may be a generic warning that simply illuminates a check engine light.

After block 218 or after block 220, the method 200 moves on to block 222 where the engine 12 is operated under a rich condition to return the oxygen storage capacity of the first catalytic converter 40 back to the set value. In the example, where the first catalyst 40 has a maximum oxygen storage capacity of 100 grams, the set value is 50 grams, and the adjusted value is 20 grams, the controller 54 may be configured to operate the engine 12 under the rich condition at block 222 to increase the oxygen storage capacity from 0 grams (or a value that is within the third tolerance from 0 grams) back to 50 grams (i.e., the set value).

Figure 5A:
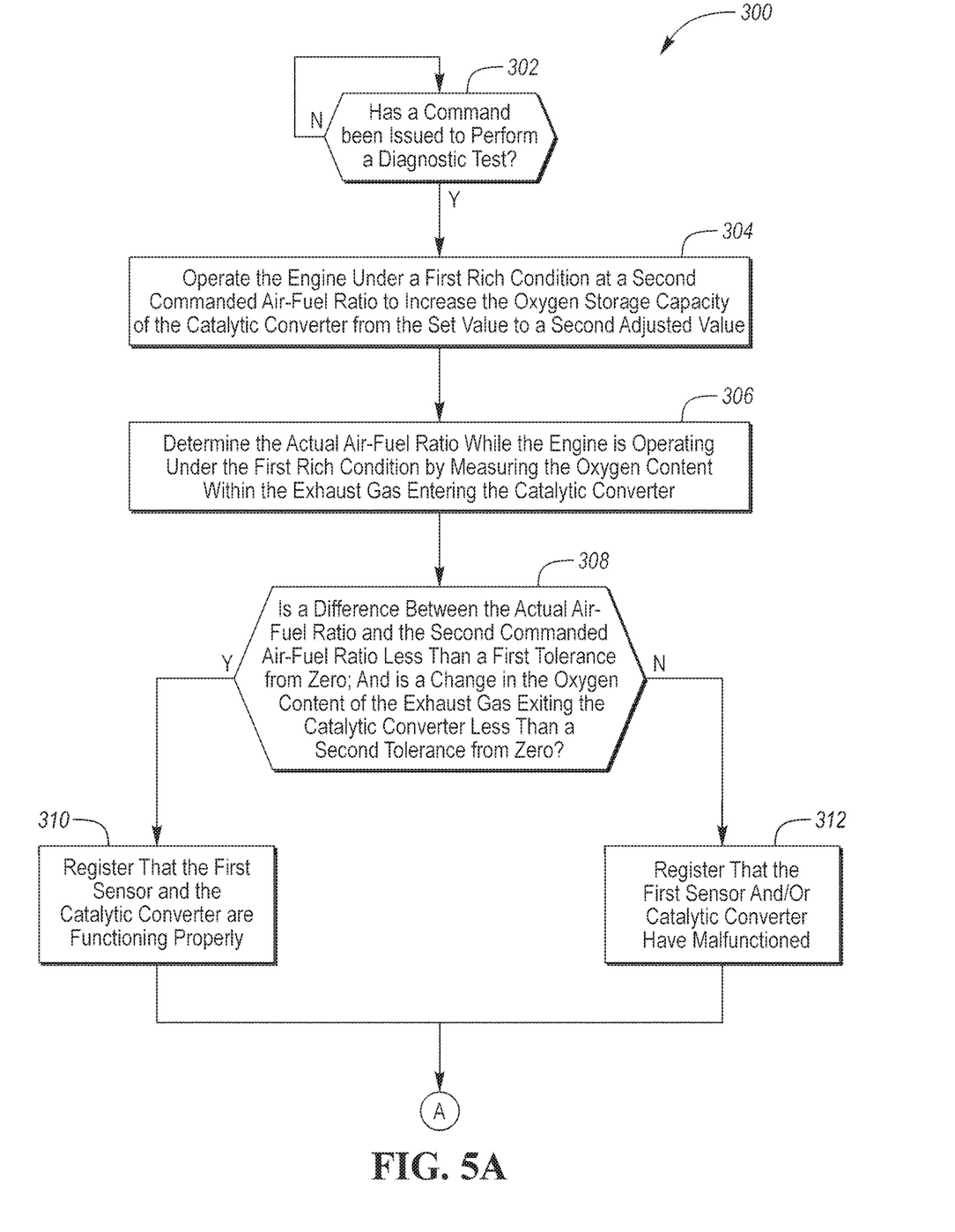
FIGS. 5A and 5B represent a flowchart of a method of conducting a second diagnostic test on the exhaust system of the engine.
Figure 5B:
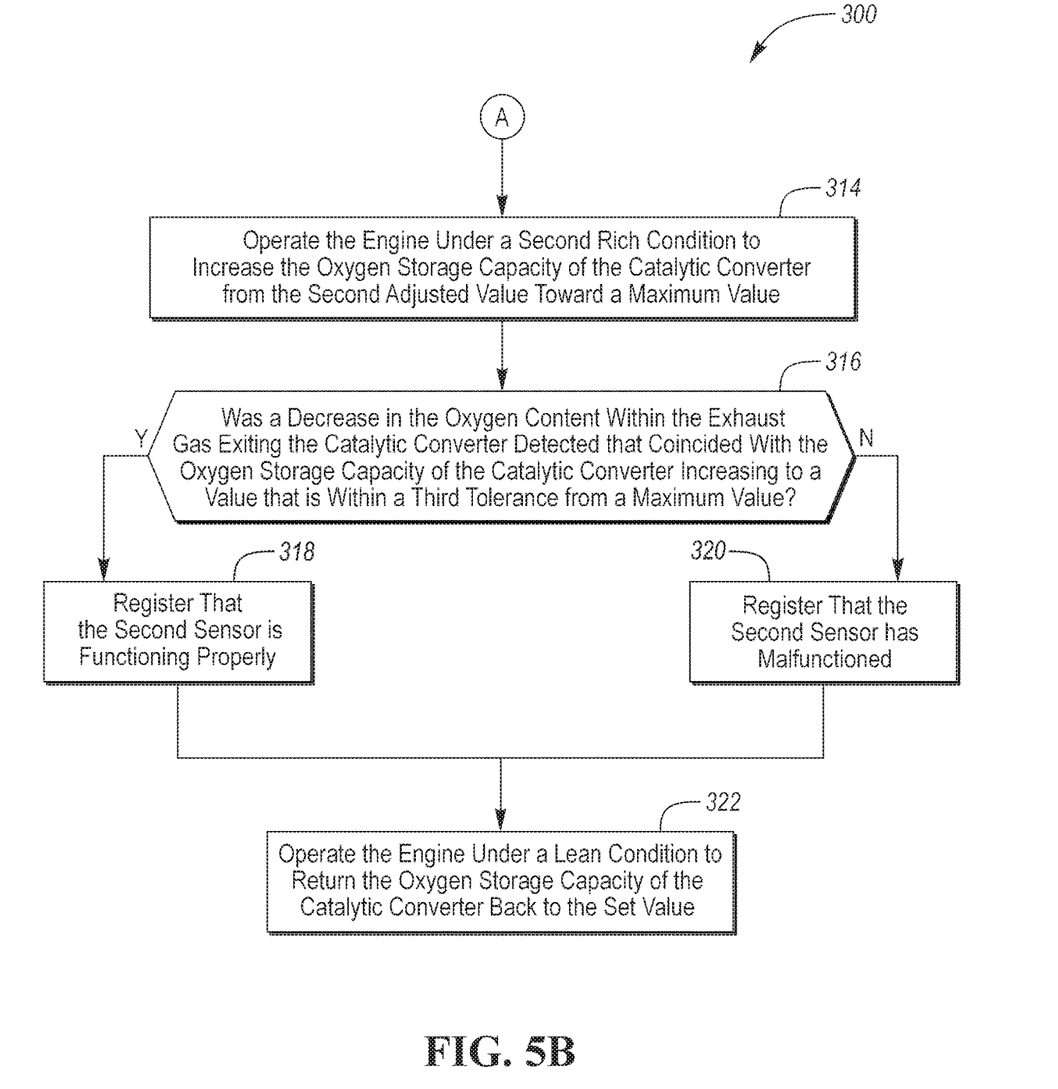

Referring to FIGS. 5A and 5B, a flowchart of a method 300 of conducting a second diagnostic test on the exhaust system 20 of the engine 12 is illustrated. The method 300 may be stored as control logic and/or an algorithm within the controller 54. The controller 54 may be programmed to implement the method 300 by controlling the various components of the vehicle 10. The method 300 begins at block 302 where it is determined if a command has been issued to perform the second diagnostic test. The second diagnostic test may be referred to as an onboard diagnostic test that is configured to verify that the first catalytic converter (i.e., first catalyst 40), the first lambda or oxygen sensor 62, and the second lambda or oxygen sensor 64 of the exhaust system 20 are functioning properly. The purpose of the diagnostic test is to ensure that the specific components of the exhaust system 20 are properly reducing the emissions within the exhaust gas being produced by the engine 12 that is being introduced into the surrounding environment. The second diagnostic test should be performed once the first catalytic converter 40 has obtained the light-off temperature. The second diagnostic test may be performed at least once during each cycle that the engine 12 is operated. The results of the second diagnostic test (i.e., whether the first catalyst 40, the first oxygen sensor 62, and the second oxygen sensor 64 are properly functioning) may be stored within the controller 54.

If it is determined that the command has not been issued to perform the second diagnostic test, the method 300 recycles back to the beginning of block 302. If it is determined that the command has been issued to perform the second diagnostic test, the method 300 moves on to block 304 where the engine 12 is operated under a first rich condition (i.e., a condition where the air-fuel ratio is rich and the air-fuel equivalence ratio, $\lambda$, is less than 1) at a second commanded air-fuel ratio (i.e., a specified rich air-fuel ratio) to increase the oxygen storage capacity (i.e., the amount of available space to store oxygen) of the first catalytic converter 40 from the set value to a second adjusted value. For example, the first catalyst 40 may have maximum oxygen storage capacity of 100 grams, the set value may be 50 grams, the second adjusted value may be 80 grams, and the controller may be configured to increase the oxygen storage capacity from 50 grams (i.e., the set value) to 80 grams (i.e., the second adjusted value) at block 304. The storage capacity of the first catalytic converter 40 is increased when the engine 12 is operated under a rich condition because the excess hydrocarbons in the exhaust gas produced by the engine 12 react with the oxygen that is stored within the first catalytic converter 40 resulting in additional free space to store oxygen. The set value in method 300 may be the same set value as in method 200 or may be a different set value. It should be under stood that the oxygen storage capacity, the set value, and the second adjusted value may be other values than listed in the example just above. Based on measurements from the first oxygen sensor 62 and the second oxygen sensor 64, the amount of oxygen storage capacity within the first catalytic converter 40 may be estimated, adjusted, and stored within the controller 54 during all of the steps of the method 300 based on equations (1)-(3) above.

Next, the method 300 moves on to block 306 where an actual or a measured air-fuel ratio that the engine 12 is operating at, while the engine 12 is operating under the first rich condition at block 304, is determined by measuring the oxygen content (or the by measuring the air-fuel equivalence ratio, $\lambda$) within the exhaust gas entering the first catalytic converter 40 via the first oxygen sensor 62. Once the actual or measured air-fuel ratio that the engine 12 is operating at is determined, the method 300 moves on to block 308 where it is determined if a difference between the actual or measured air-fuel ratio and the second commanded air-fuel ratio, while the engine 12 was operating under the first rich condition at block 304, is less than a first tolerance from zero, and if a change in the oxygen content of the exhaust gas exiting the catalytic converter 40 (which may be a change from a stoichiometric value where air-fuel equivalence ratio, $\lambda$, is equal to 1 to a rich value where the air-fuel equivalence ratio, $\lambda$, is less than 1), while the engine 12 was operating under the first rich condition at block 304, is less than a second tolerance from zero. The oxygen content of the exhaust gas exiting the catalytic converter 40 is measured by the second oxygen sensor 64. If the second catalytic converter 40 is properly filtering out the emissions within the exhaust gas, the second oxygen sensor 64 should be detecting a stoichiometric air-fuel ratio (i.e., an air-fuel equivalence ratio, $\lambda$, of 1). Block 308 may more specifically determine if there is any change in the reading of the second oxygen sensor 64 from the stoichiometric air-fuel ratio that is less than the second tolerance from zero.

Ideally, the difference between the actual or measured air-fuel ratio and the second commanded air-fuel ratio and the change in the oxygen content of the exhaust gas exiting the catalytic converter 40 will be zero, while the engine 12 was operating under the first rich condition at block 304, if the first oxygen sensor 62 and the first catalytic converter 40 are operating properly and correctly. However, minor deviations from zero (i.e., the first tolerance and second tolerance)

may be tolerated due to imperfections in the exhaust system 20 or minor calculation errors within the first oxygen sensor 62, second oxygen sensor 64, or the controller 54. For example, the first tolerance and second tolerance may correspond to a difference in air-fuel equivalence ratio, $\lambda$, from a desired or expected value that ranges between 0.00 and 0.01 toward either a leaner value or a richer value. The first tolerance and second tolerance in method 300 may correspond to the first tolerance and second tolerance in method 200, respectively, or may have different values.

If is determined at block 308 that the difference between the actual or measured air-fuel ratio and the second commanded air-fuel ratio is less than the first tolerance from zero and the change in the oxygen content of the exhaust gas exiting the catalytic converter 40 is less than the second tolerance from zero, the method 300 moves on the block 310 where the controller 54 registers (e.g., stores within the memory of the controller 54) that the first oxygen sensor 62 and the first catalytic converter 40 are operating correctly and properly. Also, at block 310, the controller 54 may illuminate a warning light on a control panel within the vehicle 10 or activate some other notification system (e.g., a warning sound or haptic feedback) to alert the operator of the vehicle 10 that the first oxygen sensor 62 and/or the first catalytic converter 40 are operating correctly and properly.

If is determined at block 308 that the difference between the actual or measured air-fuel ratio and the second commanded air-fuel ratio is not less than the first tolerance from zero and/or the change in the oxygen content of the exhaust gas exiting the catalytic converter 40 is not less than the second tolerance from zero, method 300 moves on the block 312 where the controller 54 registers (e.g., stores within the memory of the controller 54) that the first oxygen sensor 62 and/or the first catalytic converter 40 are not operating correctly and have malfunctioned. Also, at block 312, the controller 54 may illuminate a warning light on a control panel within the vehicle 10 or activate some other notification system (e.g., a warning sound or haptic feedback) to alert the operator of the vehicle 10 that the first oxygen sensor 62 and/or the first catalytic converter 40 are not operating correctly and have malfunctioned. Alternatively, the warning may be a generic warning that simply illuminates a check engine light.

After block 310 or after block 312, method 300 moves on to block 314 where the engine 12 is operated under a second rich condition (i.e., a condition where the air-fuel ratio is rich and the air-fuel equivalence ratio, $\lambda$, is less than 1) to increase the oxygen storage capacity (i.e., the amount of available space to store oxygen) of the first catalytic converter 40 from the second adjusted value towards a maximum value. In the example, where the first catalyst 40 has a maximum oxygen storage capacity of 100 grams, the set value is 50 grams, and the second adjusted value is 80 grams, the controller 54 may be configured to increase the oxygen storage capacity from 80 grams (i.e., the second adjusted value) towards 100 grams at block 314. Eventually, the oxygen storage capacity of the first catalytic converter 40 may be increased to the maximum value while the engine 12 is operating under the second rich condition at block 314. The engine 12 may be operated at a stoichiometric air-fuel ratio (i.e., and air-fuel equivalence ratio, $\lambda$, of 1) between being operated under the first rich condition and the second rich condition while the controller 54 is verifying whether or not the first oxygen sensor 62 and the first catalyst 40 are operating properly and correctly according to blocks 308, 310, and 312.

The oxygen storage capacity of the first catalytic converter 40 may be increased from the second adjusted value towards the maximum value (or eventually to the maximum value) in incremental steps during the second rich condition at block 314. More specifically, the oxygen storage capacity of the first catalytic converter 40 may be increased from the second adjusted value towards the maximum value in incremental steps by operating the engine 12 under multiple rich conditions for short periods of time that are separated by periods of time where the engine 12 is operated under stoichiometric conditions. In the example, where the first catalyst 40 has a maximum oxygen storage capacity of 100 grams, the set value is 50 grams, and the second adjusted value is 80 grams, the controller 54 may be configured to operate the engine 12 to increase the oxygen storage capacity from 80 grams (i.e., the second adjusted value) by 1 gram during each short period that the engine 12 is operated under a rich condition at block 314. For example, the oxygen storage capacity may be increased to 81 grams after a first short period of time, to 82 grams after a second short period time, to 83 grams after a third short period of time, etc. until the oxygen storage capacity of the first catalytic converter 40 is increased to 100 grams (i.e., the maximum value).

Next, the method 300 moves on to block 316 where it is determined if a decrease in the oxygen content within the exhaust gas exiting the first catalytic converter 40 was detected by the second oxygen sensor 64, while the engine 12 was operating under the second rich condition at block 314, that coincided with the oxygen storage capacity of the first catalytic converter 40 increasing to a third tolerance from the maximum value. The third tolerance in method 300 may correspond to the third tolerance in method 200 or may have a different value. A decrease in the oxygen content detected at block 314 by the second oxygen sensor 64 may coincide with a change in the reading of the second oxygen sensor 64 from a stoichiometric value (i.e., where the air-fuel equivalence ratio, $\lambda$, is equal to 1) to a rich value (i.e., where the air-fuel equivalence ratio, $\lambda$, is less than 1).

Ideally, a decrease in the oxygen content within the exhaust gas exiting the first catalytic converter 40 should be detected by the second oxygen sensor 64 once the oxygen storage capacity reaches the maximum value, while the engine 12 is operating under the second rich condition at block 314, if the second oxygen sensor 64 is operating properly and correctly. However, minor deviations from the maximum value (i.e., the third tolerance) may be tolerated due to imperfections in the exhaust system 20 or minor calculation errors within the first oxygen sensor 62, second oxygen sensor 64, or the controller 54. For example, the third tolerance may correspond to a value that ranges between 0 grams and 1 gram from the maximum value. Furthermore, if a decrease in the oxygen content within the exhaust gas exiting the first catalytic converter 40 is detected within the third tolerance from the maximum value, at a value other than the maximum value, the controller 54 may be configured to update the known maximum value point of the oxygen storage capacity of the first catalytic converter 40 (i.e., the stored data point within the controller 54 that corresponds to the first catalytic converter 40 having a maximum oxygen storage capacity) such that a subsequent diagnostic test may be conducted more accurately.

If is determined at block 316 that a decrease in the oxygen content within the exhaust gas exiting the first catalytic converter 40 was detected by the second oxygen sensor 64, while the engine 12 was operating under the second rich condition at block 314, that coincided with the oxygen storage capacity of the first catalytic converter 40 increasing to a value that is within the third tolerance from the maximum value, the method 300 moves on to block 318 where the controller 54 registers (e.g., stores within the memory of the controller 54) that the second oxygen sensor 64 is operating correctly and properly. Also, at block 318, the controller 54 may illuminate a warning light on a control panel within the vehicle 10 or activate some other notification system (e.g., a warning sound or haptic feedback) to alert the operator of the vehicle 10 that the second oxygen sensor 64 is operating correctly and properly.

Also at block 316, a determination that a decrease in the oxygen content within the exhaust gas exiting the first catalytic converter 40 was detected by the second oxygen sensor 64, while the engine 12 was operating under the second rich condition at block 314, that coincided with the oxygen storage capacity of the first catalytic converter 40 increasing to a value that is within the third tolerance from the maximum value may verify that the first oxygen sensor 62 and the first catalytic converter 40 are operating correctly and properly (i.e., may verify block 310). Verification at block 318 may be required before, the controller 54 registers that the first oxygen sensor 62 and the first catalytic converter 40 are operating correctly and properly according to block 310.

If is determined at block 316 that a decrease in the oxygen content within the exhaust gas exiting the first catalytic converter 40 was not detected by the second oxygen sensor 64, while the engine 12 was operating under the second rich condition at block 314, that coincided with the oxygen storage capacity of the first catalytic converter 40 increasing to a value that is within the third tolerance from the maximum value, the method 300 moves on to block 320 where the controller 54 registers (e.g., stores within the memory of the controller 54) that the second oxygen sensor 64 is not operating correctly and has malfunctioned. Also, at block 320, the controller 54 may illuminate a warning light on a control panel within the vehicle 10 or activate some other notification system (e.g., a warning sound or haptic feedback) to alert the operator of the vehicle 10 that the second oxygen sensor 64 is not operating correctly and has malfunctioned. Alternatively, the warning may be a generic warning that simply illuminates a check engine light.

After block 318 or after block 320, the method 300 moves on to block 322 where the engine 12 is operated under a lean condition to return the oxygen storage capacity of the first catalytic converter 40 back to the set value. In the example, where the first catalyst 40 has a maximum oxygen storage capacity of 100 grams, the set value is 50 grams, and the second adjusted value is 80 grams, the controller 54 may be configured to operate the engine 12 under the lean condition at block 322 to decrease the oxygen storage capacity from 100 grams (or a value that is within the third tolerance from 100 grams) back to 50 grams (i.e., the set value).

The first diagnostic test illustrated in FIGS. 4A and 4B and the second diagnostic test illustrated in FIGS. 5A and 5B may be operated separately to verify whether or not the first oxygen sensor 62, second oxygen sensor 64, and the first catalytic converter 40 are operating correctly and properly. Alternatively, the first diagnostic test illustrated in FIGS. 4A and 4B and the second diagnostic test illustrated in FIGS. 5A and 5B may each be required to verify whether or not the first oxygen sensor 62, second oxygen sensor 64, and the first catalytic converter 40 are operating correctly and properly. It should be understood that the designations of first, second, third, fourth, etc. for any values, tolerances, lean conditions, rich conditions, commanded air-fuel ratios, tolerances, or any other component, state, or condition described herein may be rearranged in the claims so that they are in chronological order with respect to the claims.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle controller programmed to, in response to a command to perform a diagnostic test:
  operate an engine under a first lean condition at a commanded air-fuel ratio to decrease an oxygen storage capacity of a catalytic converter from a set value to an adjusted value that is greater than zero;
  determine an actual air-fuel ratio based on measuring an oxygen content within exhaust gas entering the catalytic converter via a first sensor, while the engine is operating under the first lean condition; and
  in response to a difference between the actual air-fuel ratio and the commanded air-fuel ratio being less a first tolerance from zero and a change in the oxygen content within the exhaust gas exiting the catalytic converter, that is measured via a second sensor, being less than a second tolerance from zero, while the engine is operating under the first lean condition, register that the first sensor and the catalytic converter are functioning properly.

2. The controller of claim 1, wherein the controller is further programmed to:
  operate the engine under a second lean condition, after operating the engine under the first lean condition, to decrease the oxygen storage capacity of the catalytic converter from the adjusted value toward zero; and
  in response to detecting an increase in the oxygen content within the exhaust gas exiting the catalytic converter coinciding with the oxygen storage capacity decreasing to a value within a third tolerance from zero, while the engine is operating under the second lean condition, register that the second sensor is functioning properly.

3. The controller of claim 2, wherein the controller is further programmed to, while the engine is operating under the second lean condition,
  in response to not detecting an increase in the oxygen content within the exhaust gas exiting the catalytic converter when with the oxygen storage capacity of the catalytic converter decreases to zero, register that the second sensor has malfunctioned.

4. The controller of claim 2, wherein the oxygen storage capacity is decreased from the adjusted value towards zero in incremental steps during the second lean condition.

5. The controller of claim 2, wherein the controller is further programmed to, while the engine is operating under the second lean condition:

in response to detecting an increase in the oxygen content within the exhaust gas exiting the catalytic converter coinciding with the oxygen storage capacity decreasing to a value within the third tolerance from zero, adjust a zero point of the oxygen storage capacity.

6. The controller of claim 2, wherein the controller is further programmed to, operate the engine under a rich condition, after operating the engine under the second lean condition, to increase the oxygen storage capacity of the catalytic converter to the set value.

7. The controller of claim 1, wherein the controller is further programmed to, while the engine is operating under the first lean condition:
   in response to the difference between the actual air-fuel ratio and the commanded air-fuel ratio exceeding the first tolerance from zero or the change in the oxygen content within the exhaust gas exiting the catalytic converter exceeding the second tolerance from zero, register that the first sensor and/or the catalytic converter have malfunctioned.

8. A vehicle controller programmed to, in response to a command to perform a diagnostic test:
   operate an engine under a first rich condition at a commanded air-fuel ratio to increase an oxygen storage capacity of a catalytic converter from a set value to an adjusted value;
   determine an actual air-fuel ratio based on measuring an oxygen content within exhaust gas entering the catalytic converter via a first sensor, while the engine is operating under the first rich condition; and
   in response to a difference between the actual air-fuel ratio and the commanded air-fuel ratio being less a first tolerance from zero and a change in the oxygen content within the exhaust gas exiting the catalytic converter, that is measured via a second sensor, being less than a second tolerance from zero, while the engine is operating under the first rich condition, register that the first sensor and the catalytic converter are functioning properly.

9. The controller of claim 8, wherein the controller is further programmed to:
   operate the engine under a second rich condition, after operating the engine under the first rich condition, to increase the oxygen storage capacity of the catalytic converter from the adjusted value toward a maximum value; and
   in response to detecting a decrease in the oxygen content within the exhaust gas exiting the catalytic converter coinciding with the oxygen storage capacity increasing to a value within a third tolerance from the maximum value, register that the second sensor is functioning properly.

10. The controller of claim 9, wherein the controller is further programmed to, while the engine is operating under the second rich condition,
    in response to not detecting a decrease in the oxygen content within the exhaust gas exiting the catalytic converter when with the oxygen storage capacity of the catalytic converter increases to the maximum value, register that the second sensor has malfunctioned.

11. The controller of claim 9, wherein the oxygen storage capacity is increased from the adjusted value towards the maximum value in incremental steps during the second rich condition.

12. The controller of claim 9, wherein the controller is further programmed to, while the engine is operating under the second rich condition:
    in response to detecting a decrease in the oxygen content within the exhaust gas exiting the catalytic converter coinciding with the oxygen storage capacity increasing to a value within the third tolerance from the maximum value, adjust a maximum value point of the oxygen storage capacity.

13. The controller of claim 9, wherein the controller is further programmed to, operate the engine under a lean condition, after operating the engine under the second rich condition, to decrease the oxygen storage capacity of the catalytic converter to the set value.

14. The controller of claim 8, wherein the controller is further programmed to, while the engine is operating under the first rich condition:
    in response to the difference between the actual air-fuel ratio and the commanded air-fuel ratio exceeding the first tolerance from zero or the change in the oxygen content within the exhaust gas exiting the catalytic converter exceeding the second tolerance from zero, register that the first sensor and/or the catalytic converter have malfunctioned.

15. A vehicle controller programmed to, in response to a command to perform a diagnostic test:
    operate an engine under a first lean condition at a first commanded air-fuel ratio to decrease an oxygen storage capacity of a catalytic converter from a set value to an adjusted value;
    determine an actual air-fuel ratio based on measuring an oxygen content within exhaust gas entering the catalytic converter via a first sensor, while the engine is operating under the first lean condition;
    operate the engine under a first rich condition at a second commanded air-fuel ratio to increase the oxygen storage capacity of the catalytic converter from the set value to a second adjusted value;
    determine the actual air-fuel ratio based on measuring the oxygen content within exhaust gas entering the catalytic converter via the first sensor, while the engine is operating under the first rich condition; and
    in response to a difference between the actual air-fuel ratio and the first commanded air-fuel ratio being less a first tolerance from zero, while the engine is operating under the first lean condition, a difference between the actual air-fuel ratio and the second commanded air-fuel ratio being less the first tolerance from zero, while the engine is operating under the first rich condition, and a change in the oxygen content within the exhaust gas exiting the catalytic converter, that is measured via a second sensor, being less than a second tolerance from zero, while the engine is operating under the first lean condition and the first rich condition, register that the first sensor and the catalytic converter are functioning properly.

16. The controller of claim 15, wherein the controller is further programmed to:
    operate the engine under a second lean condition, after operating the engine under the first lean condition, to decrease the oxygen storage capacity of the catalytic converter from the adjusted value toward zero;
    operate the engine under a second rich condition, after operating the engine under the first rich condition, to increase the oxygen storage capacity of the catalytic converter from the second adjusted value toward a maximum value; and
    in response to detecting an increase in the oxygen content within the exhaust gas exiting the catalytic converter coinciding with the oxygen storage capacity decreasing to a value within a third tolerance from zero, while the engine is operating under the second lean condition, and detecting a decrease in the oxygen content within the exhaust gas exiting the catalytic converter coinciding with the oxygen storage capacity increasing to a value within a fourth tolerance from the maximum value, while the engine is operating under the second rich condition, register that the second sensor is functioning properly.

17. The controller of claim 15, wherein the oxygen storage capacity is decreased from the adjusted value towards zero in incremental steps during the second lean condition.

18. The controller of claim 15, wherein the oxygen storage capacity is increased from the second adjusted value towards the maximum value in incremental steps during the second rich condition.

19. The controller of claim 15, wherein the controller is further programmed to, operate the engine under a third rich condition, after operating the engine under the second lean condition, to increase the oxygen storage capacity of the catalytic converter to the set value.

20. The controller of claim 15, wherein the controller is further programmed to, operate the engine under a third lean condition, after operating the engine under the second rich condition, to decrease the oxygen storage capacity of the catalytic converter to the set value.

* * * * *

UNITED STATES PATENT AND TRADEMARK OFFICE
CERTIFICATE OF CORRECTION

PATENT NO. : 10,690,036 B1
APPLICATION NO. : 16/227920
DATED : June 23, 2020
INVENTOR(S) : Szczepanski et al.

Page 1 of 1

It is certified that error appears in the above-identified patent and that said Letters Patent is hereby corrected as shown below:

In the Claims

Column 18, Line 34, Claim 1:
After "and the commanded air-fuel ratio being less"
Insert -- than --.

Column 19, Line 32, Claim 1:
After "and the commanded air-fuel ratio being less"
Insert -- than --.

Column 20, Line 41, Claim 15:
After "and the commanded air-fuel ratio being less"
Insert -- than --.

Signed and Sealed this
Sixth Day of October, 2020

Andrei Iancu
*Director of the United States Patent and Trademark Office*